(12) United States Patent  
Muirhead (10) Patent No.: US 8,171,862 B2  
(45) Date of Patent: May 8, 2012

(54) FOLDING TABLE

(75) Inventor: Andrew Muirhead, Norderstedt (DE)

(73) Assignee: Lufthansa Technik AG, Hamburg (DE)

( * ) Notice: Subject to any disclaimer, the term of this patent is extended or adjusted under 35 U.S.C. 154(b) by 155 days.

(21) Appl. No.: 12/397,592

(22) Filed: Mar. 4, 2009

(65) Prior Publication Data

US 2009/0223417 A1 Sep. 10, 2009

(30) Foreign Application Priority Data

Mar. 4, 2008 (DE) .......................... 10 2008 012 523

(51) Int. Cl.
*A47B 23/00* (2006.01)

(52) U.S. Cl. ......................... 108/44; 108/152; 108/50.01

(58) Field of Classification Search .................... 108/45, 108/46, 42, 49, 50.01, 152, 44; 297/145, 297/161; 248/918; 312/223.2, 223.3
See application file for complete search history.

(56) References Cited

U.S. PATENT DOCUMENTS

| 2,554,685 | A | * | 5/1951 | St Denis ........................ 108/45 |
| 2,592,032 | A | * | 4/1952 | Henderson ..................... 108/33 |
| 2,597,330 | A | * | 5/1952 | Huddleston .................... 108/45 |
| 4,889,057 | A | * | 12/1989 | Chartrand ..................... 108/42 |
| 5,195,709 | A | * | 3/1993 | Yasushi .................... 297/188.14 |
| 5,221,070 | A | * | 6/1993 | Heilmer ........................ 248/458 |
| 5,322,021 | A | * | 6/1994 | Jackson ......................... 108/44 |
| 5,588,727 | A | * | 12/1996 | D'Agaro et al. ............. 248/918 |
| 5,671,686 | A | * | 9/1997 | Hurley et al. .................. 108/45 |
| 5,730,065 | A | * | 3/1998 | Smith ............................ 108/44 |
| 6,347,590 | B1 | * | 2/2002 | D'Annunzio et al. ......... 108/44 |
| 7,032,522 | B2 | * | 4/2006 | George et al. ............. 108/50.01 |
| 7,082,882 | B2 | * | 8/2006 | Heimbrock .................... 108/49 |
| 7,178,469 | B2 | * | 2/2007 | Goza ........................ 108/50.01 |
| 2003/0159628 | A1 | | 8/2003 | Salzer et al. | |
| 2005/0062715 | A1 | | 3/2005 | Tsuji et al. | |

FOREIGN PATENT DOCUMENTS

| DE | 197 05 754 | 8/1998 |
| DE | 200 16 393 | 3/2002 |
| EP | 1 517 220 | 3/2005 |
| WO | WO-01/92055 | 12/2001 |

\* cited by examiner

*Primary Examiner* — Jose V Chen
(74) *Attorney, Agent, or Firm* — Morrison & Foerster LLP (57) ABSTRACT

A table for attaching to the wall of an aircraft. The table has a table top comprising at least two table top segments which are moveable relative to each other. At least one table top segment has a screen on one side. Two table top segments are pivotable or rotatable in relation to each other about at least two axes. The first axis runs parallel to an edge of a table top segment. The second axis runs substantially perpendicularly to the first axis in the plane of a table top segment.

21 Claims, 5 Drawing Sheets

FOLDING TABLE

FIELD OF THE INVENTION

The invention relates to a table for attaching to the wall of an aircraft or the like, with a table top comprising at least two table top segments which are moveable relative to each other.

BACKGROUND OF THE INVENTION

Flap tables or folding tables for use on board aircraft or in other transport means are known from prior public use. They can generally be brought into a stowed position (for example during take-off and landing) in which they are folded, for example, against the backrest of the seat in front or against a cabin paneling or other wall or are stowed, for example, in an armrest.

SUMMARY OF THE INVENTION

The invention is based on the object of providing a versatile table of the type mentioned at the beginning.

For this purpose, the table according to the invention has the following features:
  a) at least one table top segment has a screen on one side;
  b) two table top segments are pivotable or rotatable in relation to each other about at least two axes, with the first axis running parallel to an edge of a table top segment and the second axis running substantially perpendicularly to the first axis in the plane of a table top segment.

First of all, some of the terms used within the context of the invention will be explained.

A table within the meaning of the invention is a device which, in a use state (unfolded state), provides a surface which can be used as a base. The table is designed for attaching to the wall of an aircraft or the like. The term "wall" is not restricted within the context of the invention to conventional walls, but rather comprises any device which can entirely or partially accommodate the table in a stowed position or against which the table can be folded in the stowed position. Here it may in particular involve a surface, which is optionally designed as a depression, on a wall paneling of the aircraft cabin, a piece of equipment in the aircraft cabin such as, for example, the backrest of a seat in front, or a stowage space, for example in an armrest of a seat or the like.

The table has at least two table top segments which are moveable relative to each other. As will be further explained below, the user of the table can use the table in different ways. For example, the two table top segments may be moved with respect to each other in such a manner that, in alignment together, they form a substantially flat table surface; alternatively, only one of the two segments may be used (for example by the two table top segments being folded onto each other) or the two segments may be used differently. For this purpose, the two table top segments are pivotable and rotatable in relation to each other about at least two axes. The first axis lies substantially parallel to an edge of a table top segment. The two segments can be folded in relation to each other about said axis. It is thus possible, for example, to fold two table top segments onto each other about said axis (for example in order to prepare the stowing operation) or to unfold them into a position in which the two segments lie substantially in one plane and can form a common table surface. The second axis is arranged substantially perpendicularly to the first axis in the plane of a table top segment. It gives the two table top segments a second rotational degree of freedom with respect to each other. Said degree of freedom makes it possible to bring the second table top into a multiplicity of different positions relative to the first table top.

This is of particular importance in conjunction with the screen provided according to the invention on one side of at least one table top segment. The screen can preferably be fitted on one side of the second table top segment. The free rotatability of said second table top segment then makes it possible to bring the first table top segment into a substantially horizontal use position (in which it can be used as a table) and to bring the screen of the second table top segment into a use position which is convenient for viewing the screen and in which, for example, films can be viewed on the screen. Alternatively, it is possible to fold the two table top segments onto each other in such a manner that only the screen side of the second table top segment faces toward the user. In this position, it is possible, for example if the screen is designed as a "touch screen", to work with screen contents, for example to write emails or the like. Also conceivable is an arrangement of the two table top segments with respect to each other in such a manner that they lie and are aligned substantially in one plane but such that the screen in the second table top segment faces upward. In this position, work can likewise be carried out on the screen and documents can be arranged on the surface of the first table top segment.

It is preferred if a first table top segment is arranged on or can be fastened moveably to the wall or the other retaining or stowing device for the table and a second table top segment is connected moveably to the first table top segment. By moving the first table top segment relative to the wall or other retaining devices, the entire table (first, second and, if appropriate, further table top segments together) can then be brought into a desired position and, subsequently, if the need arises, the second table top segment can also be adjusted relative to the first table top segment, for example the screen can be brought into a desired viewing angle.

The device for fastening the first table top segment to a wall or other retaining or stowing devices for the table is preferably designed in such a manner that it comprises at least one rotational degree of freedom. The first table top segment is preferably pivotable (if appropriate together with the second table top segment) about a first axis which runs substantially parallel to that edge of the first table top segment which faces the wall or other retaining device. Said rotational degree of freedom enables the table to be folded down, for example, from a wall or the backrest of a seat in front.

In a further variant of the invention, the first table top segment is additionally rotatable in relation to the wall about a second axis which runs substantially perpendicularly to the first axis in the plane of the first table top segment.

According to this variant, the first table top segment therefore has an additional rotational degree of freedom in relation to the wall. Said additional degree of freedom is advantageous, for example, if the table is merely to be used as a screen. For this purpose, the two table top segments can be folded onto each other in such a manner that the screen of the second table top segment faces outward. Pivoting and rotating the first table top segment together with the second table top segment folded thereon then enables the screen to be adjusted to any desired viewing angle.

The connecting devices between the wall and first table top segment, on the one hand, and first and second table top segments, on the other hand, may be, for example, a 3D joint, a ball and socket joint or the like. It is also possible, for example, for the first and second table top segments to be connected to each other, for example, via a hinge arranged centrally at the connecting edge thereof, with, for example, the second table top segment then additionally being rotatable onto an axis of the hinge perpendicular to the above-described hinge axis.

It is possible within the context of the invention for the first table top segment to be able to be fixed in one or more defined use positions relative to the wall. Such a use position may be, for example, a substantially horizontal arrangement which renders the table usable, for example for eating meals. Other defined use positions may comprise, for example, typical viewing positions for the screen. The fixing in such use positions can take place either via suitable locking devices; alternatively, it is possible for the abovementioned joint or hinge connections to have latching positions in certain angular positions, out of which the table top segment can be moved only counter to a relatively large resistance.

It is furthermore preferred for the second table top segment to be able to be fixed in one or more defined use positions relative to the first table top segment. Such a use position may be, for example, an aligned arrangement of the two table top segments in one plane in a manner such that the screen of the second table top segment faces downward and the entire surface of the first and second table top segments can be jointly used as a table. Other defined use positions can be again preferred viewing or working positions for the screen on the other side of the second table top segment.

It is therefore preferred that the second table top segment has a table surface on one side or main surface and a screen on the opposite side. The table surface is provided with a customary surface, such as, for example, a wood veneer, a laminate coating or the like. The opposite side has a flat screen, such as, for example, an LCD display or the like.

The screen preferably takes up a considerable part of the entire surface of the opposite side of the second table top segment; preferred minimum values are 50%, 60%, 70%, 80% and 90% of the entire surface of the corresponding side of the second table top segment. It is preferred for the screen to substantially take up the entire surface of the corresponding side of the second table top segment, with it being possible for corresponding gripping or, if appropriate, actuating devices for moving the second table top segment and/or for controlling screen contents to be provided at the borders.

The screen can have touch-sensitive control elements. The screen may be, for example, a touch screen which is basically known in the prior art, or a "multi-touch screen" operable using a number of fingers. Said control elements can be used to operate communications software and/or entertainment software, for example.

An orientation sensor can be provided which permits automatic adaptation of the alignment of the on-screen display as a function of the orientation of the screen in space. The free pivotability of the table top segment with the screen permits different alignments in space. In a preferred configuration, the screen may be, for example, rectangular, with the rectangle having different side lengths. For example, the screen may have one of the customary aspect ratios 4:3, 3:2 or 16:9. The orientation sensor can then ensure that the on-screen display is automatically oriented upright in every selected position of the screen in space (for example landscape or portrait format). In this manner, a user can, for example, rotate the screen into the landscape format for viewing films and into the portrait format for reading texts. The on-screen display is automatically adapted.

The invention furthermore relates to an arrangement comprising a wall and a table according to the invention. The term wall refers here again to all of the possible retaining devices and/or surfaces on which or in which a table can be held in the stowed state. In the arrangement, the table can be brought into a stowed position in which it is arranged substantially parallel to a wall surface. For example, it can be folded against the backrest of a seat in front or against a surface, provided for this purpose, of a cabin wall or cabin paneling or of a corresponding item of cabin furniture. In said stowed position, it can be arranged in a depression which is provided for this purpose and can preferably be adapted to the depth (overall height) of the table in the stowed position.

In the stowed position, the table top segments of the table can preferably be folded onto each other and arranged substantially parallel to each other. This minimizes the required surface or overall size of the device for stowing the table.

In the stowed position, the screen can face away from the wall and can therefore be visible to a user. It is thereby possible to use the screen even in the stowed position of the table. For example, flight and/or safety information can be output via the screen before or during take-off or landing. An exemplary embodiment is described below with reference to the drawings, in which:

DETAILED DESCRIPTION OF THE INVENTION

Figures 1, 2:
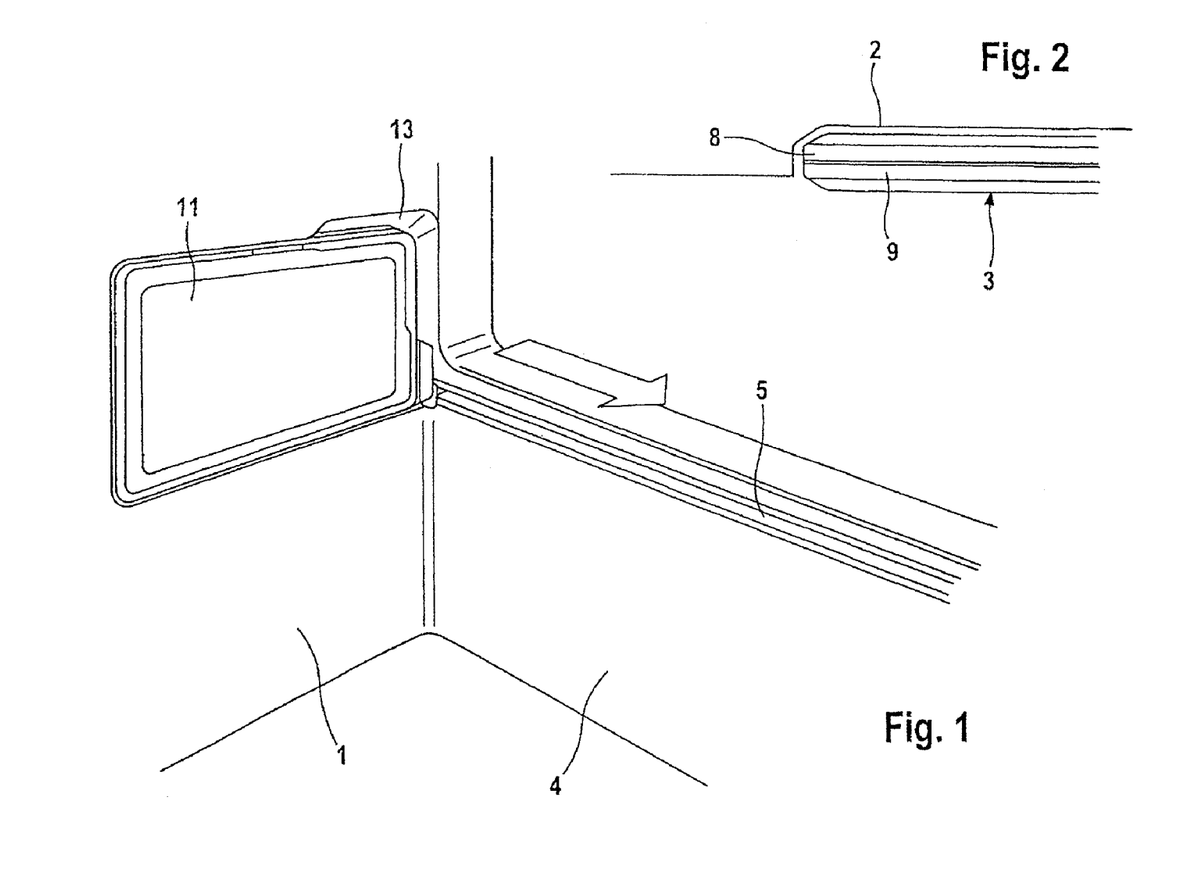
FIG. 1: schematically shows an arrangement according to the invention with the table in the stowed state.
FIG. 2: shows a partially sectioned view from above of the table in the stowed state.
Figure 3:
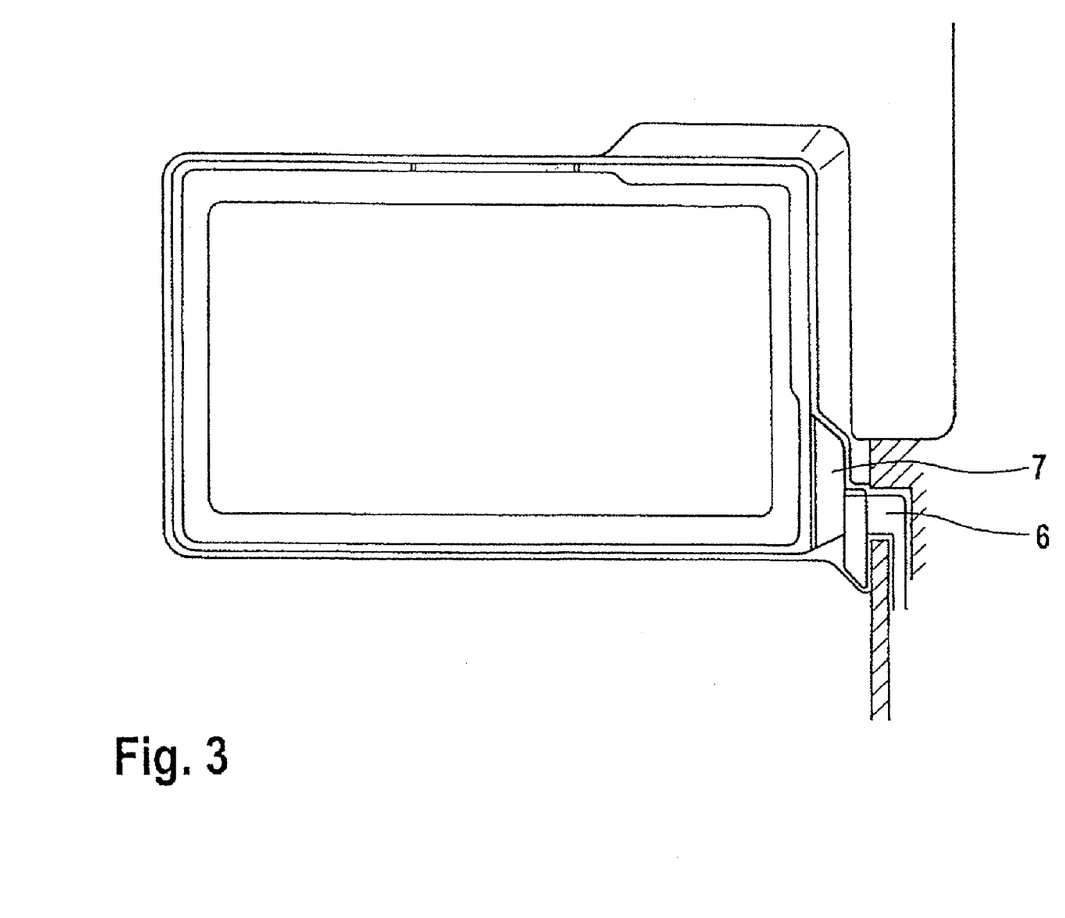
FIG. 3: shows a view of the table in the stowed state.

FIG. 1 schematically shows a partial view of a "private cabin for first class" of a commercial airliner. Such a private cabin is generally separated off from the rest of the aircraft cabin to the front and rear, if appropriate also to a side, in the sitting direction by means of walls of half height.

In the front wall 1 of said private cabin there is a depression or trough 2 (see FIG. 2) which is designed for receiving a table according to the invention, referred to overall by 3.

A guide rail 5 is arranged in the side wall 4 of the private cabin. A guide slide 6 which holds the first table top 8 of the table 3 by means of the joint 7 slides in the guide rail 5. The first table top 8 and the second table top 9 are connected to each other by means of a 3D joint 10. The second table top 9 has a touch-sensitive screen (touch screen) 11 on the side facing the user in the stowed state.

In this embodiment, each table top segment measures 42×30 cm; of course, other dimensions are possible.

It can be seen in FIG. 1 that the table according to the invention can serve in the stowed state, in which it is arranged in the trough 2, as a screen for the passenger, said screen being embedded in the front wall 1 of the private cabin. In order to control the screen contents, operating elements which are arranged within reach of a seated passenger can be provided, for example, in the side wall 4 of the private cabin at 12 (see FIG. 6); said operating elements can either be fixedly arranged operating elements or a receptacle for a remote control and, if appropriate, for other devices, such as, for example, a passenger's portable audio and/or video player.

As can be seen in FIG. 2, the table 3 in the stowed position protrudes somewhat out of the trough 2 and can therefore be grasped at the borders and pulled out. A recessed grip 13 on the border of the depression or trough 2 makes said gripping and pulling out easier. It can be provided that first of all a lock (not illustrated in the drawing) has to be released in order to pull the table 3 out of its stowed position.

The guide slide 6 slides in the guide rail 5 during the pulling-out operation. The table can be brought into any position in the guide rail 5.

Figure 6:
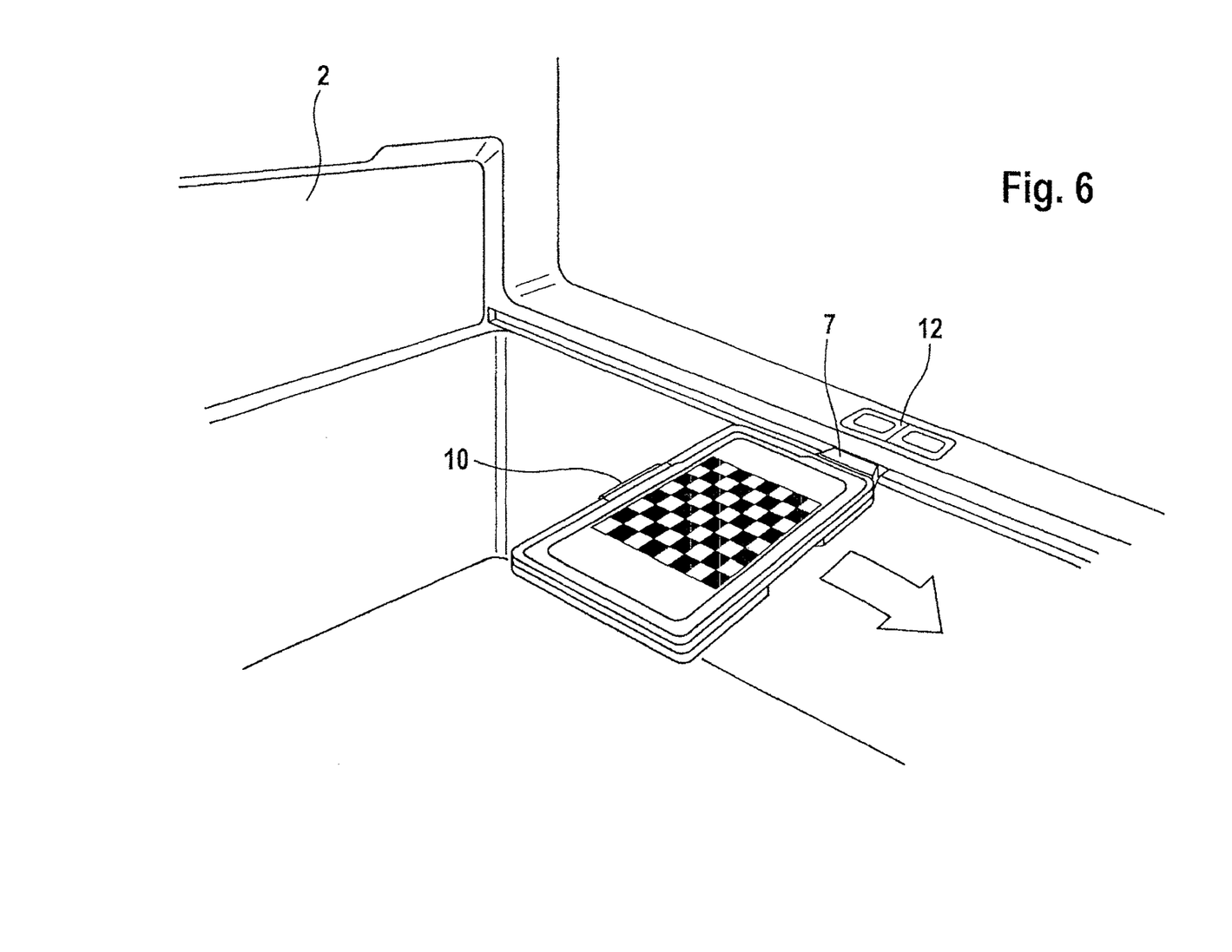

The table can then be brought by means of the joint 7 into a desired angular position, for example can be pivoted out of the vertical position forward through 90° in the horizontal position shown in FIG. 6.

Within the context of the invention, it is possible for the joint 7 to be a 3D joint with more than one rotational degree of freedom. It is also possible for said joint 7 to merely have one rotational degree of freedom, and it therefore merely makes it possible to pivot the table 3 out of the vertical stowed position (FIG. 1) into a horizontal use position (FIG. 6) about the horizontal axis of rotation of said joint 7.

In the use position shown in FIG. 6, the screen 11 of the table faces upward and makes it possible, for example, to use the screen for work, for example for dealing with text, emails or the like. The screen can furthermore display a playing surface, for example for a game of chess against a computer (not illustrated in the drawing). The playing figures can be moved by the touch-sensitive screen.

Figure 4:
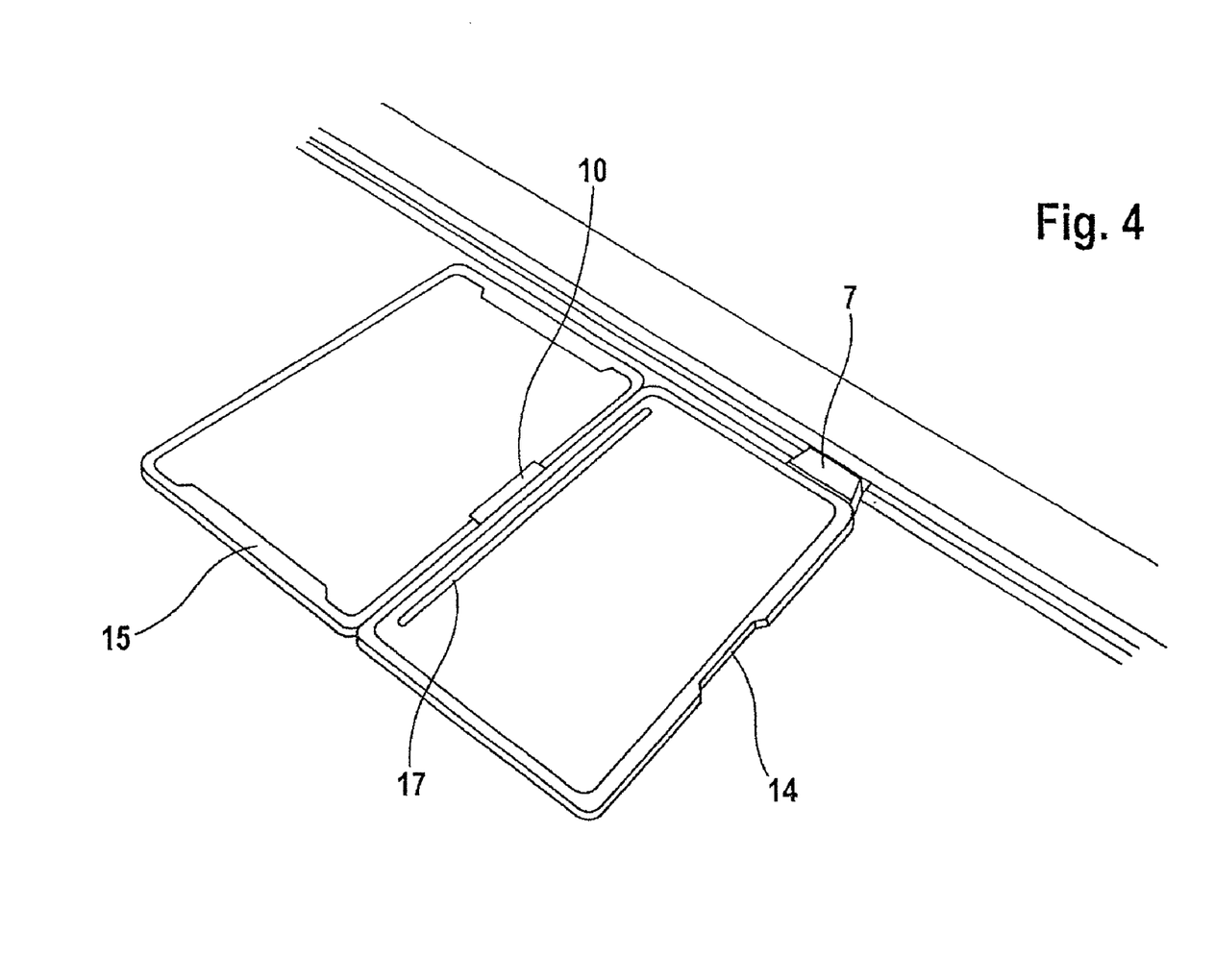
FIGS. 4 to 6: show the table in different use states.

FIG. 4 shows a use state in which the table top segment 9 has been folded over from the state in FIG. 6 in relation to the table top segment 8 about a first axis of the joint 10 (said axis of rotation runs parallel to those edges of the table top segments 8 and 9 which face each other). As can be seen in FIG. 4, the two table top segments 8 and 9 in this use state form a horizontal use surface or table surface with a large useable surface area. That surface of the table top segments which faces upward in said use state can be provided, for example, with a wood veneer, a laminate coating or another suitable surface coating. A latching or locking device (not illustrated in the drawing) is expediently provided, said latching or locking device fixing the two table top segments 8, 9 in relation to each other in said use position, or permitting them to rotate in relation to each other only if a relatively large effort is made. A recessed grip 14 permits simple displacement of the table in the guide rail 5 and/or a change in the angular position. A widened frame portion 15 on the second table top segment 9 makes it easier to move said second table top segment 9 relative to the first table top segment 8.

Figure 5:
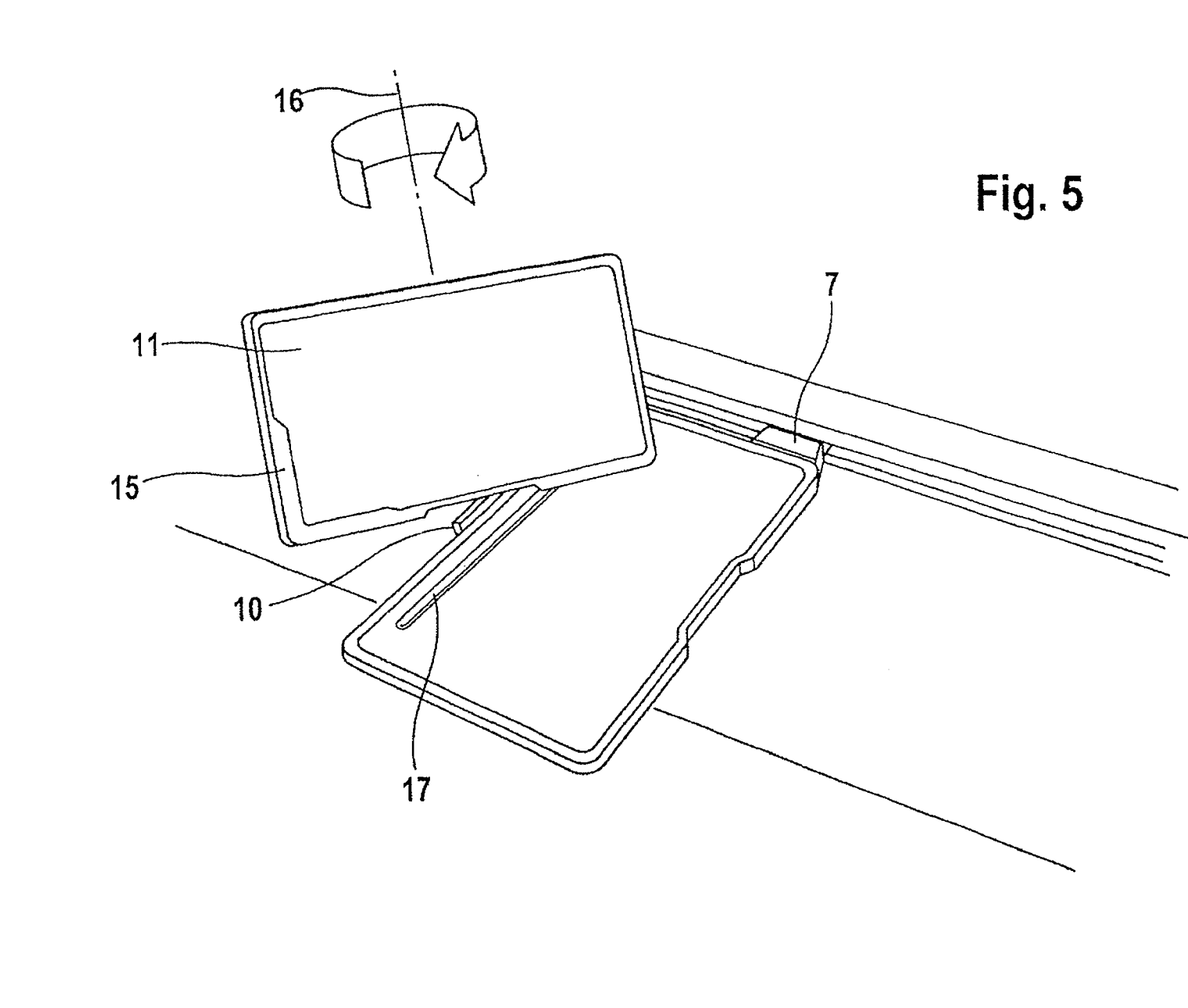

FIG. 5 shows a further use position of the table according to the invention. The second table top segment 9 has been folded upward out of the horizontal position shown in FIG. 4; subsequently, the second table top segment 9 has been rotated about the second axis of the 3D joint 10 (indicated at 16 in FIG. 5) such that the screen 11 now faces toward the passenger. In this position, the first table top segment 8 can be used as a table surface and the second table top segment 9 can be used at the same time as a display or screen.

One or more rails (indicated at 17) can be provided in the first table top segment 8, which rails can secure the border of the particular table top segment, for example can secure magazines against slipping down. Said rails 17 can preferably be recessed in the corresponding table top segment surface so that they do not obstruct the two table top segments 8, 9 from folding flat against each other.

The invention claimed is:

1. A table for attaching to a wall, comprising:
    a table top comprising first and second table top segments which are moveable relative to each other about at least two axes and a connecting device between the first and second table top segments,
    wherein the first and second table top segments are pivotable by the connecting device in relation to each other about a first axis running parallel to an edge of one of the first and second table top segments,
    wherein the first and second table top segments are rotatable by the connecting device in relation to each other about a second axis running substantially perpendicularly to the first axis in a plane of one of the first and second table top segments,
    wherein the second table top segment has a screen on one side;
    wherein in a first use position the first and second table top segments are aligned in one plane with the screen in the second table top segment facing downward for jointly using the entire surface of the first and second table top segments as a table,
    wherein in a second use position the first and second table top segments are aligned in one plane with the screen in the second table top segment facing upwards, and
    wherein in a third use position the first and second table top segments are folded onto each other with only the screen side of the second table top segment facing upward.

2. The table as claimed in claim 1, wherein the first table top segment is fastened moveably to the wall and the second table top segment is connected moveably to the first table top segment.

3. The table as claimed in claim 2, wherein the first table top segment is pivotable in relation to the wall about a first axis which runs parallel to that edge of the first table top segment which faces the wall.

4. The table as claimed in claim 3, wherein the first table top segment is additionally rotatable in relation to the wall about a second axis which runs substantially perpendicularly to the first axis in the plane of the first table top segment.

5. The table as claimed in one of claims 2 to 4, wherein the first table top segment is fixable relative to the wall in one or more defined use positions.

6. The table as claimed in one of claims 2 to 4, wherein the second table top segment is fixable relative to the first table top segment in one or more defined use positions.

7. The table as claimed in one of claims 2 to 4, wherein the second table top segment has a table surface on one side and a screen on the opposite side.

8. The table as claimed in claim 7, wherein the screen takes up at least 50%, of an entire surface of the opposite side of the second table top segment.

9. The table as claimed in one of claims 1 to 4, wherein the screen has touch-sensitive control elements.

10. The table as claimed in one of claims 1 to 4, further comprising an orientation sensor that permits automatic adaptation of the alignment of on-screen displays as a function of the orientation of the screen in space.

11. An arrangement comprising a wall and a table as claimed in claim 1 fastened to the wall.

12. The arrangement as claimed in claim 11, wherein the table is arranged substantially parallel to a wall surface.

13. The arrangement as claimed in claim 12, wherein, in the stowed position, the table is arranged in a depression in the wall.

14. The arrangement as claimed in claim 12 or 13, wherein the table top segments of the table are folded onto each other in the stowed position and are arranged substantially parallel to each other.

15. The arrangement as claimed in claim 12 or 13, wherein, in the stowed position, the screen faces away from the wall.

16. The table as claimed in claim 7, wherein the screen takes up at least 60% of an entire surface of the opposite side of the second table top segment.

17. The table as claimed in claim 7, wherein the screen takes up at least 70% of an entire surface of the opposite side of the second table top segment.

18. The table as claimed in claim 7, wherein the screen takes up at least 80% of an entire surface of the opposite side of the second table top segment.

19. The table as claimed in claim 7, wherein the screen takes up at least 90% of an entire surface of the opposite side of the second table top segment.

20. The table as claimed in claim 1, wherein the connecting device comprises a joint.

21. The table as claimed in claim 1, wherein the connecting device comprises a hinge.

* * * * *

UNITED STATES PATENT AND TRADEMARK OFFICE
CERTIFICATE OF CORRECTION

| | | |
|---|---|---|
| PATENT NO. | : 8,171,862 B2 | Page 1 of 1 |
| APPLICATION NO. | : 12/397592 | |
| DATED | : May 8, 2012 | |
| INVENTOR(S) | : Andrew Muirhead | |

It is certified that error appears in the above-identified patent and that said Letters Patent is hereby corrected as shown below:

In the Claims:

At column 6, claim number 8, line number 41, please replace "50%," with --50%--.

Signed and Sealed this
Ninth Day of October, 2012

David J. Kappos
*Director of the United States Patent and Trademark Office*